May 15, 1951 R. L. WALLACE, JR 2,553,490

MAGNETIC CONTROL OF SEMICONDUCTOR CURRENTS

Filed Feb. 21, 1949 2 Sheets-Sheet 1

INVENTOR
R. L. WALLACE, JR.
BY Harry C. Hart
ATTORNEY

MAGNETIC CONTROL OF SEMICONDUCTOR CURRENTS

Filed Feb. 21, 1949 2 Sheets-Sheet 2

INVENTOR
R.L. WALLACE, JR.
BY Harry C. Hart
ATTORNEY

Patented May 15, 1951

2,553,490

UNITED STATES PATENT OFFICE 2,553,490

MAGNETIC CONTROL OF SEMICONDUCTOR CURRENTS

Robert L. Wallace, Jr., Plainfield, N. J., assignor to Bell Telephone Laboratories, Incorporated, New York, N. Y., a corporation of New York Application February 21, 1949, Serial No. 77,507

14 Claims. (Cl. 332—44)

This invention relates to semiconductor translating devices and particularly to the control of the current in such devices by the application of magnetic fields.

It is a principal object of the invention to control the direction of flow of a current through a semiconductive body by the application of a magnetic field.

A related object is to direct the current which flows in a semiconductive body due to the injection of charges at one point thereof toward one or another of a plurality of collector electrodes, as desired, and there to withdraw it in an amplified form.

Related objects are to provide a magnetically controlled switch for a signal current; a push-pull amplifier, a signal modulator, an oscillator, and the like, in each of which a current is controlled in its direction of flow by the influence of a magnetic field; while at the same time the current is amplified by transistor action.

Another related object is to control the resistance or impedance of a rectifier contact or junction by magnetic influences.

The invention utilizes as its central element a semi-conductor amplifier. In its original form as described in an application Serial No. 11,165, filed February 26, 1948, and later allowed to become abandoned, and in another application of the same inventors, Serial No. 33,466, filed June 17, 1948, which is a continuation in part of the former application and which issued on October 3, 1950, as Patent 2,524,035, the device, which has since come to be known as a "transistor," comprises a small block of semiconductor material such as N-type high back voltage germanium having at least three electrodes coupled thereto, termed the emitter, the collector and the base electrode. The emitter and the collector may be point-contact electrodes making rectifier contact with one face of the block and very close together, while the base electrode may be a film of metal plated over the opposite face of the block and providing a low resistance contact. The emitter may be biased for conduction in the forward direction, while the collector is preferably biased for conduction in the reverse direction. Application of an electrical disturbance, for example a signal, to the emitter electrode modifies the distribution of the mobile charges in the interior of the semiconductor block. These mobile charges move within the block, and there appears in a load circuit, connected to the collector, an output signal which is an amplified version of the voltage, current and power of the input signal.

In an application of J. R. Haynes and W. Shockley, Serial No. 50,894, filed September 24, 1948, there is described a modified transistor which departs from its prototype in three major regards. First, the spacing, along the semiconductor block surface, between the emitter and the collector have been greatly increased. This results in a time delay between the application of a disturbance to emitter and the appearance of a corresponding disturbance at the collector. This delay is due to the fact that the velocities of movement of the mobile charges or current carriers within the semiconductor material are restricted, so that a substantially greater transit time is required for their migration over the increased distance. Second, the block itself is elongated and narrowed into the form of a thin filament to constrain the mobile charges to substantially rectilinear paths of lengths sufficient to provide substantial transit times. Third, instead of a single base electrode plated over the opposite face of the block, two electrodes are provided, which make low resistance contact with the ends of the filament, one at the emitter end and the other at the collector end. When a difference of potential is applied between these end electrodes, an electric field is established longitudinally of the filament. It is this field which guides or entrains the mobile charges originating at the emitter to the collector. In its absence they would flow away from the emitter in both directions.

In the elongated transistor of the aforementioned Haynes-Shockley application, the point contact collector electrode, though helpful, is not essential. Amplification is obtainable without it, by virtue of the passage of the injected charges across a barrier separating material of one conductivity type from material of opposite conductivity type; or indeed, merely by virtue of the alteration of the resistance of the elongated semiconductor strip itself. Such an arrangement is described in an application of G. L. Pearson and W. Shockley, Serial No. 50,897, filed September 24, 1948, and issued on April 4, 1950, as Patent 2,502,479.

In one of its aspects the present invention is based on the realization that, due to the special nature of the current which flows in a semiconductor amplifier of the type described in the aforementioned Haynes-Shockley application, this current is subject to deflection or diversion by the application of a magnetic field. In other aspects the invention turns such magnetically controlled deflection or diversion of the current to account in the construction of various useful devices such as switches, modulators, amplifiers, oscillators and the like. In still another aspect the invention combines the function of magnetic control of the direction of current flow with amplification of the current strength variations in accordance with transistor action.

Considering the first-named aspect of the invention alluded to above, it is, of course, well-known that the application of a magnetic field to a conductor in which a current is flowing tends to deflect the current from its rectilinear path. In the ordinary metal or semiconductor material, such deflection of current takes place on a transient basis only, because the initial deflection results in an accumulation of charge at one side of the conductor and therefore of a potential gradient laterally of the conductor, which potential gradient counteracts all further tendency of the current to be deflected, so that, while a measurable voltage, which is known as the Hall voltage, appears between the two sides of the conductor, the current continues to flow parallel with the axis of the conductor and remains undeflected by the magnetic field.

In the case of a material such as N-type germanium, the mobile charges normally present in excess are electrons. As explained in the aforementioned applications of John Bardeen and W. H. Brattain, when a metal point is placed in contact with the surface of this material and biased positively by a fraction of a volt, positive charges, known as holes, are injected into the semiconductor body. These positive charges, in turn, attract electrons from neighboring conductors in numbers sufficient to neutralize them on the statistical basis; that is to say, to prevent the body of the semiconductor from accumulating a potential. The individual charges, however, do not neutralize each other but rather constitute carriers of current, the positive holes flowing in one direction under the influence of an electric field and the negative electrons flowing in the opposite direction.

Now when a magnetic field is applied transversely of the semiconductor body at a location or in a region intermediate the emitter and the collector, the positive charges are deflected in one angular direction, for example clockwise, while the electrons are deflected in the opposite angular direction, for example counterclockwise. In each case the combination of the magnetically-controlled deflection and the axial movement of the charges under the influence of the electric field results in a deviation of the charges from their rectilinear paths and an accumulation of them at one side or the other of the semiconductor body. But because the charges occur in pairs of opposite sign, this accumulation does not result in a transverse electric field to balance them as in the case of the conventional Hall effect. Rather, they may be diverted as close to one side or the other of the semiconductor body as desired. In particular, they may be directed toward the region in which a collector makes contact with the semiconductor body. In travelling through this region they act to reduce its resistance. As they approach the collector itself they come within the influence of its field, which exists by reason of its bias with respect to the semiconductor body. Here the injected charges which are of opposite sign to the collector bias are attracted to the collector itself while the balancing charges meet a concentrated local retarding field and are repelled. Thus the injected charges gather at the collector contact point. Here, and especially if the collector makes rectifier contact with the semiconductor body, they act to effect a substantial reduction of the contact resistance in the manner described in the aforementioned applications of John Bardeen and W. H. Brattain.

Thus, by the application of a magnetic field to the semiconductor body, there is produced not only a deviation of the current toward or away from a collector electrode, but, in addition, an alteration of the resistance of the path to the collector electrode and of the contact resistance of the collector electrode itself. The sense of these resistance changes is such as to add to the effect of directing the current toward the collector so that the collector current is increased for both reasons.

In accordance with one form of the present invention, therefore, there is provided an elongated strip of semiconductor material, an emitter electrode in contact with the strip at one region thereof, a collector electrode in reverse rectifier contact therewith at another region thereof, and means for applying a magnetic field transversely of the semiconductor strip at an intermediate region to direct the current which is composed of the charges injected by the emitter and charges of opposite sign which balance them toward the collector, where the charges injected by the emitter act to modify both the current available for collection and the resistance of the path to the collector and of its contact resistance.

In accordance with the invention in another form, a plurality of collectors engage the semiconductor body and the magnetic field acts to direct the current toward one or other of them, and to reduce the resistance of whichever one receives the major portion of this current as compared with the others.

These effects may be accentuated by the introduction of a fork in the semiconductor body itself between the location at which the magnetic field is applied and the location at which collectors engage the semiconductor body. With this construction, the semiconductor body may be constructed in the form of a fork having a collector engaging each narrow tine and an emitter engaging the narrow shank or shaft of the fork.

When the electrodes of the magnetically-controlled semi-conductor amplifier are connected externally by suitable circuits, the invention enables the construction of useful devices of various types. For example, when individual load circuits are connected to the several collectors, the result is a magnetically controlled switch for the emitter current. When a single load is connected between the two collectors, the result is a push-pull amplifier for the signal applied to generate the magnetic field. When a signal of one frequency is applied to the magnetic field winding and a signal of a different frequency is applied to the emitter, the result is a push-pull modulator, modulation products of the two signals appearing in a load which is connected in common to the two collectors. In either case, the energy developed in this load may be fed back to the terminals of the magnetic winding in accordance with known principles to produce a self-oscillating system. Still other useful devices are possible.

The invention will be fully apprehended from the following detailed description of preferred embodiments thereof taken in connection with the appended drawings, in which.

Figure 1:
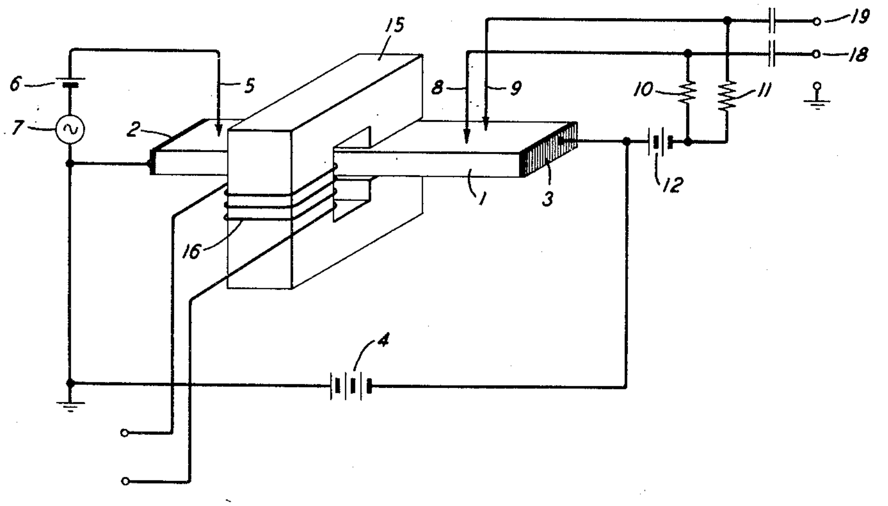
Fig. 1 is a schematic diagram of apparatus embodying the principles of the invention and useful as a magnetically-controlled current switch.

Referring now to the figures, Fig. 1 shows a block or strip 1 of semi-conductor material, for example high back voltage N-type germanium which may be prepared by any of the processes which have been developed for the manufacture of rectifiers. Such processes are described, for example, in "Crystal Rectifiers" by H. C. Torrey and C. A. Whitmer (McGraw-Hill 1948). Low resistance ohmic connections or terminals 2, 3 are provided at the opposite ends of the strip. These connections may be, for example, films or coatings of a non-corrosive metal such as rhodium, electroplated upon the strip to form non-rectifying junctions therewith. A potential source 4 interconnects the low resistance terminals, the positive terminal of the source being connected to the left-hand terminal 2 and its negative terminal to the right-hand connection 3, thus providing an electric field or voltage gradient lengthwise of the strip 1, the voltage falling in the direction from left to right.

A pointed metal electrode 5 makes contact with the surface of the strip 1 at a point near to the left-hand end. This electrode, which is termed the emitter electrode, is biased positively with respect to that part of the strip surface with which it makes contact by a fraction of a volt or so, the bias being derived from an external source such as battery 6 or in any other desired fashion, such as by way of the potential drop along the strip 1 between the electrode 2 and the electrode 5. A signal source 7 may be connected in series with the emitter electrode 5.

Two other pointed metal electrodes 8, 9, termed collectors, make contact with the surface of the strip 1 in the vicinity of the right-hand end. They are spaced apart and they are spaced from the emitter 5 by approximately equal distances. They are connected by way of individual resistors 10, 11, and a bias potential source 12 to the right-hand low resistance terminal 3 of the strip. The steady bias due to the source 12 is in the reverse direction; i. e., that in which the collector contact resistance is high. It may be of the order of 30 to 100 volts in magnitude. Improved operation results when each of the collector point contacts 8, 9, is electrically "formed" by passing through it a substantial current in the reverse direction.

The polarities of the bias sources 4, 6, 12 are appropriate for use with a semiconductor of N-type material. With a material of the P-type, the polarities of the sources should be reversed.

In accordance with the present invention a magnetic field is applied transversely of the semiconductor strip 1 in a region intermediate between the region in which the emitter makes contact with the strip and the region in which the collectors make contact with the strip. This magnetic field may be applied by any suitable means, for example, by arranging a yoke or core 15 of ferromagnetic material having a small gap in which the semiconductor strip 1 is placed. The yoke is provided with an input winding 16. Flow of current through this winding causes a magnetic field to pass through the semiconductor strip 1 in a direction normal to its surface.

In the absence of the magnetic field any disturbance at the emitter contact 5, produced for example by the signal source 7, reappears at the collector electrodes 8, 9, after a time interval determined by the transit time of charges throughout the distance separating these electrodes and in amplified form. The mechanism of such amplification is explained in the aforementioned application of J. R. Haynes and W. Shockley.

When current is caused to flow through the magnetizing winding 16, the current of charges which flows from the emitter 5 to the collectors 8, 9 is deviated from its rectilinear path. For a particular value of the current in the winding 16 and therefore of the magnetic flux through the semiconductor strip, the current may be caused to deviate from its rectilinear path by just such an amount as to produce a maximum of current in the right-hand collector contact 9 and a current minimum in the left-hand contact 8. Reversal of the sign of the current produces the opposite effect, the current output from the left-hand collector 8 being now the greater one. It has been found in some cases that deviation of the injected carriers by the application of such a magnetic field results in a change in the current output of either collector electrode by as much as a factor of 4. As a result, the current of the signal source 7 is effectively switched, by the application of the magnetic field, either to one or to the other of the two collectors 8, 9 where it produces a voltage across one or the other of the two load resistors 10, 11 and appears between one or the other of the two output terminals 18, 19, and ground.

Figure 2:
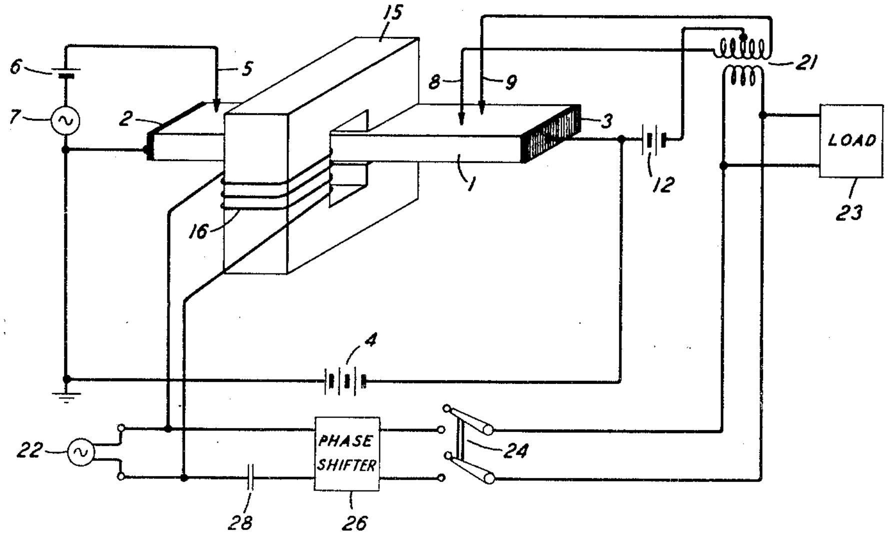
Fig. 2 is a schematic diagram of apparatus embodying the principles of Fig. 1 which may be employed as an amplifier or a modulator of signals or as a self-oscillator.

Fig. 2 shows an arrangement in which the principles illustrated in Fig. 1 are applied to the amplification or modulation of signals or to production of self-oscillations. The semiconductor block 1, the biasing sources 4, 6, 12, the signal source 7, the magnetic field-producing core 15 and its magnetizing winding 16, the emitter 5 and the collector electrodes 8, 9 may all be the same as in Fig. 1, the differences being entirely in the external circuit. Thus the two collectors 8, 9 are interconnected by way of the primary winding of an output transformer 21 whose center tap is connected to the right-hand low resistance terminal 3 of the semiconductor strip 1 by way of a collector biasing potential source 12. When a signal, derived, for example, from a source 22, is applied to the input terminals of the magnetic winding 16, it produces a deviation of the current of charge carriers flowing from the emitter 5 toward the collectors so that the application of an alternating signal to the magnetic winding 16 results in a swinging of the current stream back and forth from one of the collectors to the other. Thus the amplified collector output current flows first in one direction through the primary winding of the transformer 21 and then in the other, thus generating a signal frequency voltage across the secondary winding which may be applied to a useful load 23. If desired, this output voltage may, by closing a switch 24, be fed back to the input terminals of the winding 16, thus producing sustained self-oscillations. A phase shifter 25 may be included in the feedback path to compensate for the delay which occurs between the injection of a disturbance by the emitter and its reappearance in amplified form at either of the collectors. Tuning elements may be included to determine the frequency of steady self-oscillations in any desired manner, for example, by the connection of a tuning condenser 28 in series with the magnetizing winding 16.

If, in addition to sweeping the charge carrier stream back and forth within the semiconductor strip 1 from one of the collectors 8, 9, to the other, the strength of this current is itself varied by the application of the signals of the source 7 to the emitter, then the voltage and current output of the device as it appears across the windings of the transformer 21 comprises modulation products between the frequency of the magnetizing winding source 22 and the frequency of the emitter source 7. Thus there is provided a system for modulating the frequency of one of these sources by the other. For example, a low frequency source may be applied to the winding 16 while a carrier frequency source is applied to the emitter 5. Deviation of the current by the magnetic field produces changes which are in opposite phase in the two collectors 8, 9, while changes in the strength of this current due to the emitter signal source 7 produces changes which are of the same phase in the two collectors. Inasmuch as the two collectors are connected together by way of the transformer 21, the current strength changes due to the emitter source 7 are balanced out and the resulting signal in the secondary winding of the transformer 21 and therefore on the load 23 contains no component of the emitter signal frequency. Such an arrangement is useful, for example, as a so-called "suppressed carrier modulator."

Figure 3:
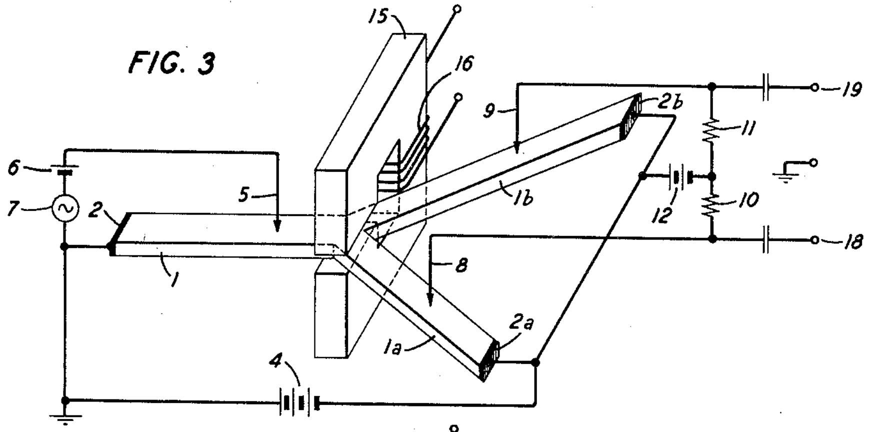
Figs. 3 and 4 are schematic diagrams of modifications of Fig. 1.

Greater efficacy may be secured in carrying out the principles of the invention by the provision of a forked path for the emitter current. Fig. 3 shows such an arrangement in which the electrodes 5, 8, 9, the bias sources 4, 6, 12, the magnet core 15 and the winding 16, as well as the external circuit connections, are the same as those of Fig. 1. Here, however, the semiconductor strip 1 is in the form of a fork or Y of narrow, elongated branches, the emitter 5 engaging the shaft of the fork, one collector 8 engaging one of its tines 1*a* and the other collector 9 engaging the other tine 1*b*. For greatest effectiveness the magnetic field is applied transversely of the semiconductor strip at a point between that at which the emitter engages the strip and the fork of the Y.

The exact angles which the tine branches of the fork make with respect to the shaft branch are not important. It is important, however, that the electric field be of the same sign in both tine branches, from the branch point to the current collector electrodes.

Point contact collectors, though helpful, are not essential. Amplification of a disturbance introduced at the emitter electrode 5 may be secured merely by reason of the variation of the resistance of the current path which this disturbance follows. Thus in Fig. 4, which is otherwise the same as Fig. 3, the point contact collector electrodes have been omitted and the external circuit is connected directly to the two low resistance ohmic films 2*a*, 2*b* at the ends of the tines 1*a*, 1*b* of the fork. It is explained in the above-mentioned application of G. L. Pearson and W. Shockley that a single unforked, narrow strip of this character gives rise, in a load circuit connected to the terminating low resistance electrode, to an amplified version of a disturbance injected at the emitter. Such amplification is believed to be due to the alteration of the conductivity of the body of the strip by the presence of charge carriers whose signs are opposite to the signs of the charges which are normally present in excess in the body of the material under equilibrium conditions. The same holds for the apparatus of Fig. 4 wherein a current due to a disturbance injected at the emitter 5 is diverted by a signal applied to the magnetic winding 16 to travel principally in one tine of the fork or the other where it appears, as explained above in connection with Figs. 1 and 3, between one of the output terminals or the other and ground.

It is also feasible to develop further amplification of the injected disturbance in either or both of the tines of the fork by forming the end portions of each tine of the fork of a material having the opposite conductivity type from the main body of the semiconductor material. Thus, the main body being of N-type high back voltage germanium, a portion of the end of each tine may be formed of P-type germanium, being separated from the remaining portions of the tine and from the body of the forked block by a high resistance barrier. It is explained in the aforementioned application of G. L. Pearson and W. Shockley that, in a single strip of this character the division of the material of the semi-conductor strip into two parts of opposite conductivities separated by a high resistance barrier results in amplification of an injected disturbance. The same holds true for the arrangement of Fig. 4 in which such a disturbance is deviated into one tine of the fork or the other by the application of a signal to the magnetizing winding 16 and the current thus diverted is amplified by the variation of the body resistance and the barrier resistance of the tine in which the principal part of this current flows, to reappear as a useful voltage across one or other of the load resistors 10, 11, and therefore between one or other of the terminals 18, 19 and ground.

Figure 4:
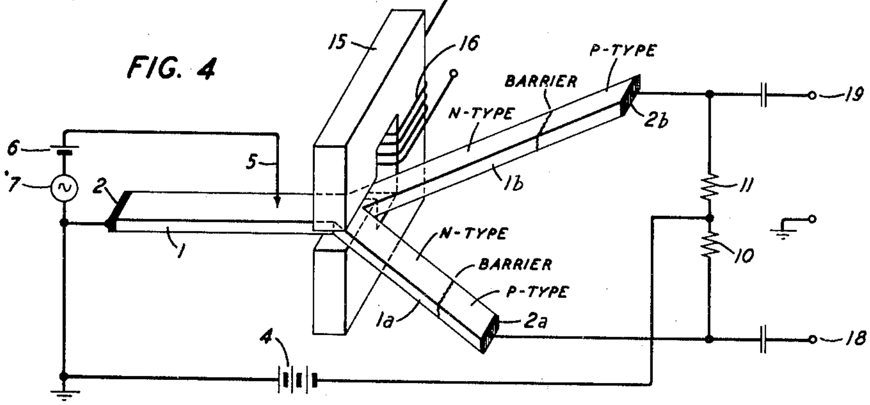
Figure 5:
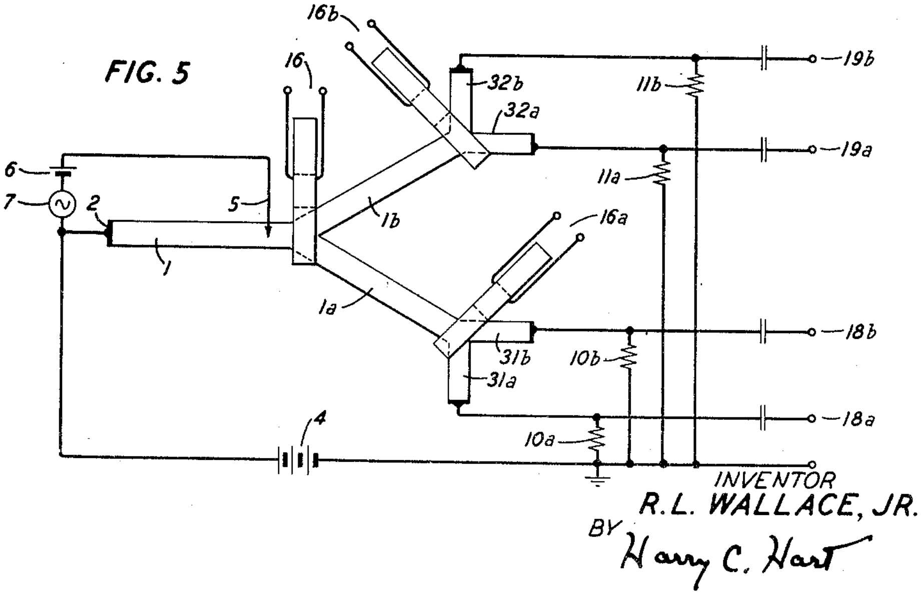
Fig. 5 is a schematic diagram of a further modification of Fig. 3 serving as a multiple point switch.

Fig. 5 shows an extension of the principles of Figs. 3 and 4 in which each tine 1*a*, 1*b* of the primary fork becomes the shaft of a secondary fork, three separate magnetic cores, each with its winding 16, 16*a* and 16*b*, being disposed just ahead of the several branch points of the fork. These magnetic cores and windings may be similar to those shown in Figs. 3 and 4 or otherwise as desired.

The arrangement of Fig. 5 operates after the fashion of a multicontact switch. From the foregoing description of the other figures it will be clear that the current due to the injection of charges at the emitter 5, whether it be a steady current or one containing signal variations, may be directed at will into the upper or the lower branch of the first fork, by the application of a signal to the first magnet winding 16. Thereupon, if flowing in the lower branch 1*a* of the first fork, it may be directed into the lower branch 31*a* or the upper branch 31*b* of the second fork in similar fashion by application of a suitable signal to the second magnet winding 16*a*. Similarly, if the original deflection be into the upper branch of the first fork, it may be directed into the upper branch 32*b* or the lower branch 32*a* of the third fork by the application of a suitable signal to the third winding 16*b*. Various combinations of the signals applied to these windings thus direct the current into any desired one of the four branches shown, where it appears as an amplified replica of the input signal across one or other of the external load resistors and therefore between any desired one of the output terminals and ground.

The tandem fork arrangement of Fig. 5 may, if desired, be combined with the intermediate barriers of Fig. 4 or with the individual point contact collector electrodes of Fig. 3. Furthermore any desired combination may be made among the various external circuits and semiconductor strip configurations shown. Still other modifications will occur to those skilled in the art.

What is claimed is:

1. A body of semiconductive material, a plurality of current collector electrodes engaging said body at different parts thereof, means for establishing within said body a current of pairs of mobile charges, which current flows in the general direction of said collector electrodes, and magnetic field means for directing said current to a selected one or another of said collector electrodes at will.

2. In combination with apparatus as defined in claim 1, individual load impedance elements connected to the several collector electrodes.

3. In combination with apparatus as defined in claim 1, a load impedance element interconnecting two collector electrodes.

4. In combination with apparatus as defined in claim 1, connections for feeding back to said magnetic field means a signal derived from at least one of said collector electrodes.

5. In combination with apparatus as defined in claim 1, a first signal source, a second signal source, means for controlling said current-establishing means by signals of said first signal source, and means for controlling said magnetic field means by signals of said second signal source.

6. A body of semiconductive material, a potential source connected to establish an electric field parallel with an axis of said body, means at one part of said body for injecting into it mobile charges of signs opposite to the signs of the mobile charges normally present in excess in the body under equilibrium conditions, a collector electrode engaging said body at a region axially spaced from said injection means, and means for establishing a magnetic field transversely of said body in a region intermediate said injection means and said collector electrode, thereby to control the direction of flow, within said body and with respect to the region in which the collector electrode engages the body, of a current of pairs of mobile charges.

7. Apparatus as defined in claim 6, wherein the charge-injection means comprises an emitter electrode making point contact with said body and means for biasing said emitter electrode in the forward direction.

8. An elongated body of semiconductive material, a potential source connected to establish an electric field longitudinally of said body, means adjacent one end of said body for injecting into it mobile charges of signs opposite to the signs of the mobile charges normally present in excess in the body under equilibrium conditions, a collector electrode engaging said body at a region spaced longitudinally from said injection means, and means for establishing a magnetic field transversely of said body in a region intermediate said injection means and said collector electrode, thereby to control the direction of flow, within said body and with respect to the region in which the collector electrode engages the body, of a current of pairs of mobile charges.

9. A body of semiconductive material, a potential source connected to establish an electric field parallel with an axis of said body, means at one part of said body for injecting into it mobile charges of signs opposite to the signs of the mobile charges normally present in excess in the body under equilibrium conditions, a plurality of collector electrodes engaging said body at regions axially spaced from said injection means, and means for establishing a magnetic field transversely of said body in a region intermediate said injection means and said collector electrodes, thereby to control the direction of flow, within said body and with respect to the several regions in which the several collector electrodes engage the body, of a current of pairs of mobile charges.

10. A forked body of semiconductive material, a potential source connected to establish an electric field longitudinally of each branch of said fork, means engaging the shaft branch of said fork for injecting into it mobile charges of signs opposite to the signs of the mobile charges normally present in excess in the body under equilibrium conditions, a collector electrode engaging each tine branch of said fork at a region spaced longitudinally from the branch point, and means for establishing a magnetic field transversely of said body in a region intermediate said injection means and said branch point, thereby to control the branching, within said body, of a current of pairs of mobile charges.

11. A forked body of semiconductive material, a potential source connected to establish an electric field longitudinally of each branch of said fork, means engaging the shaft branch of said fork for injecting into it mobile charges of signs opposite to the signs of the mobile charges normally present in excess in the body under equilibrium conditions, a point contact collector electrode engaging each tine branch of said fork at a region spaced longitudinally from the branch point, means for biasing each of said point contact collector electrodes in the reverse direction with respect to said body, and means for establishing a magnetic field transversely of said body in a region intermediate said injection means and said branch point, thereby to control the branching, within said body, of a current of pairs of mobile charges.

12. A forked body of semiconductive material, a potential source having one terminal connected to the free end of the shaft branch of said fork and the other terminal connected to the free ends of the several tine branches of said fork for establishing an electric field longitudinally of each branch of said fork, means engaging the shaft branch of said fork for injecting into it mobile charges of signs opposite to the signs of the mobile charges normally present in excess in the material of said shaft branch, means for establishing a magnetic field transversely of said body in a region intermediate said injection means and the branch point of said fork, thereby to direct a current of mobile charge pairs into a selected one of the several tine branches of said fork, and means engaging each tine branch of said fork for withdrawing current from said tine branch.

13. Apparatus as defined in claim 12 wherein the shaft branch, the branch point and a portion of each tine branch of the fork adjacent the branch point are composed of material of one conductivity type while the remaining portions of the several tine branches are composed of material of opposite conductivity type.

14. An elongated body of semiconductive material in which are normally present in excess mobile charges of one sign which, under equilibrium conditions, are balanced by fixed charges of opposite sign, a potential source for establishing an electric field longitudinally of said body, means adjacent one end of said body for injecting into it mobile charges of sign opposite to the sign of the excess mobile charges normally present, a plurality of collector electrodes substantially equidistant longitudinally from said injecting means and spaced apart laterally, said collector electrodes being similar and being biased in the reverse direction with respect to said body, a signal source connected to said injection means, load-current utilizing means connected to said collectors, and means for establishing a magnetic field transversely of said body and normal to a line connecting said collector electrodes, whereby the current of mobile charge pairs flowing in said body as a result of said charge injection is directed principally toward a selected one of said collector electrodes.

ROBERT L. WALLACE, JR.

REFERENCES CITED

The following references are of record in the file of this patent:

UNITED STATES PATENTS

| Number | Name | Date |
|---|---|---|
| 1,745,175 | Sidienfeld | Jan. 28, 1930 |
| 1,810,539 | Sokoloff | June 16, 1931 |
| 2,464,807 | Hansen | Mar. 22, 1949 |
| 2,476,323 | Rack | July 19, 1949 |
| 2,486,776 | Barney | Nov. 1, 1949 |

OTHER REFERENCES

Article—"The Transitor" from Electronics for September 1948—pages 68–71.